Jan. 28, 1964　　　K. T. GUY　　　3,119,405
COMPRESSED AIR OR OTHER GAS CONTROL VALVES
Filed June 8, 1962　　　　　　　　　　　　　　2 Sheets-Sheet 2

United States Patent Office 3,119,405
Patented Jan. 28, 1964

3,119,405
COMPRESSED AIR OR OTHER GAS
CONTROL VALVES
Kenneth Theodore Guy, Marston Green, near Birmingham, England, assignor to Rotax Limited, London, England
Filed June 8, 1962, Ser. No. 201,168
Claims priority, application Great Britain June 12, 1961
2 Claims. (Cl. 137—219)

This invention relates to valves for controlling compressed air (or other gas), and has for its object to provide such a valve in a form adapted to control the delivery pressure of the air.

A valve according to the invention comprises in combination a body part, an inlet at one side of the body part, an outlet at the opposite side of the body part, a relatively fixed hollow casing extending from the body part into the inlet, said casing having a cylindrical internal periphery and being closed at its upstream end, whilst providing angularly spaced openings adjacent the body part through which air can flow from the inlet to the outlet, a relatively fixed hollow stem extending co-axially within the casing, a relatively fixed intermediate part extending co-axially within the casing to define therein a pair of concentric annular chambers one within the other, a first closure member movable axially within the outer chamber in the manner of a piston, said first closure member having a part adapted to cover said openings in the closed position of the valve, a second closure member movable in the inner annular chamber in the manner of a piston, said second closure member having at one end a head adapted to engage a seating on the body part in the closed position of the valve, resilient means urging the second closure member towards an open position, control means whereby the first closure member will automatically assume a position dependent upon the pressure in the outlet, and further means whereby one end of the inner chamber can be subjected to inlet pressure to cause the second closure member to move towards a closed position, the arrangement being such that when the head of the second closure member is exposed beyond said part of the first closure member the flow of fluid from the inlet to the outlet will cause the head to be moved onto its seating.

Figure 1:
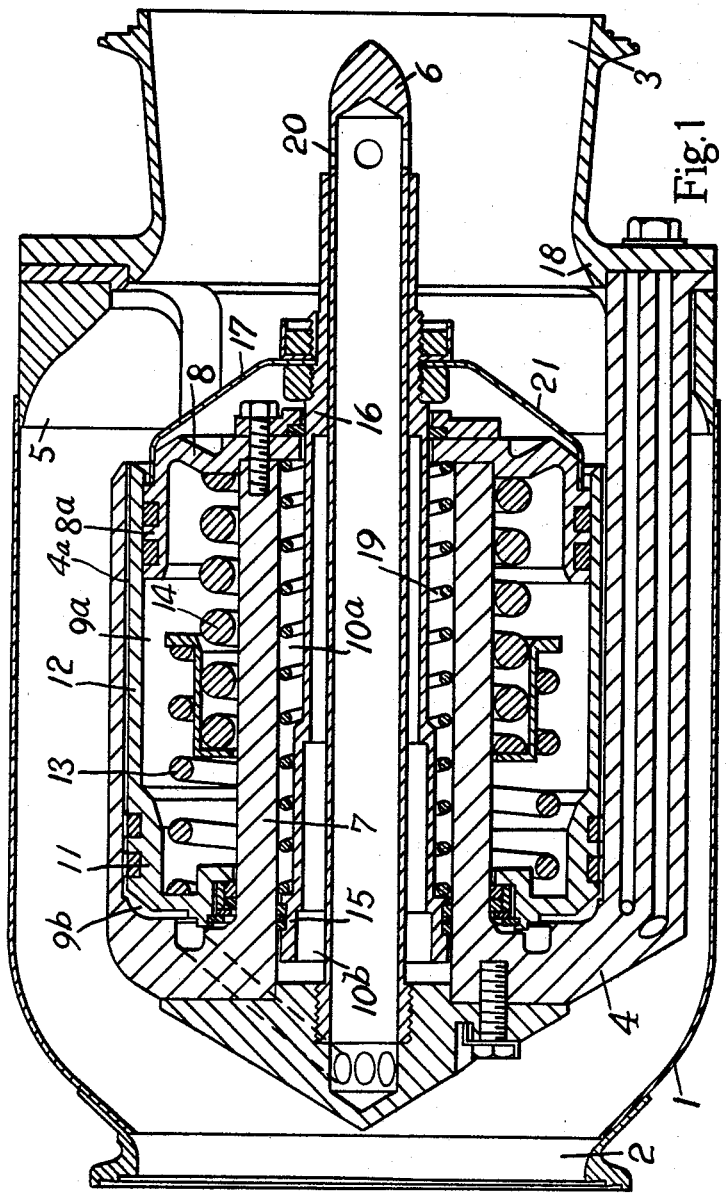
Figure 2:
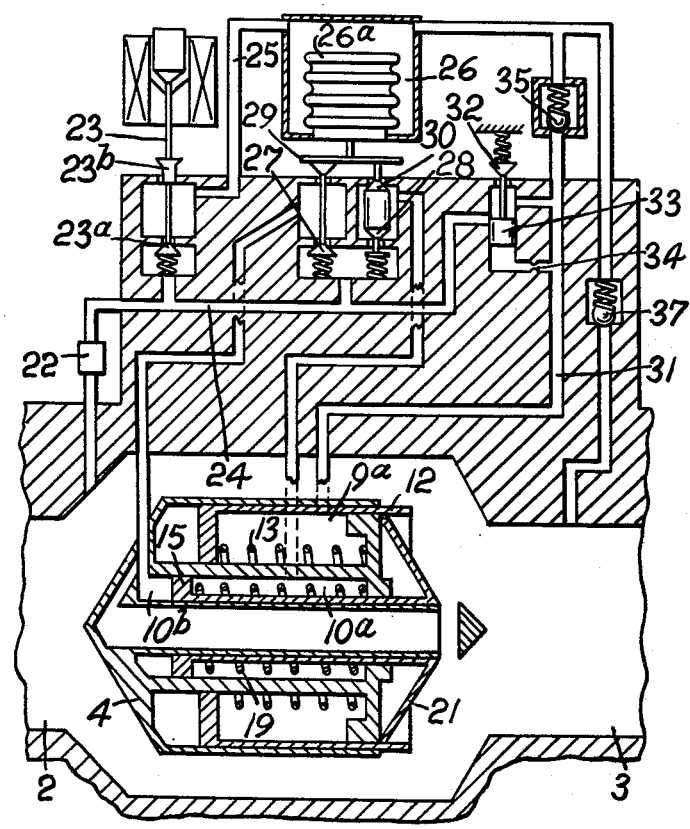

In the accompanying drawings:

FIGURE 1 is a cross sectional view of a valve constructed in accordance with the invention and FIGURE 2 is a cross sectional schematic view of the valve shown in FIGURE 1 and the associated control valves.

Referring to the drawings there is provided a body part 1 having an inlet 2 at one side and a co-axially disposed outlet 3 at its opposite side. Extending into the inlet is a relatively fixed substantially cylindrical casing 4 which is closed at its end adjacent the inlet and defines adjacent the body part a plurality of angularly spaced openings 5 through which air can flow from the inlet 2 to the outlet 3. Moreover, fixed within the casing 4 is a co-axial hollow cylindrical stem 6, and formed integrally with the casing is a cylindrical co-axial intermediate part 7 which surrounds the stem 6 in spaced relationship. The part 7 has secured to its downstream end an annular end cap 8 having an annular flange 8a in close proximity to the internal periphery of the casing 4. There is thus formed in the interior of the casing a pair of concentric chambers 9a, 9b, 10a, 10b arranged one within the other.

Within the outer chamber is a closure member 11 comprising an annular piston engaging the interior of the casing and the exterior of the intermediate part, and having a skirt 12 which is slidable within the gap between the casing 4 and the flange 8a on the intermediate part.

In the closed position of the valve the skirt fully covers the openings 5, and in the fully open position uncovers the openings. Moreover, the closure member 11 subdivides the outer chamber into an opening chamber 9a and a closing chamber 9b. Furthermore, the opening chamber 9a accommodates a pair of coiled compression springs 13, 14 urging the closure member 11 towards an open position.

In the inner chamber is a closure member 15 comprising an annular piston engaging the internal periphery of the intermediate part 7 and a tubular part 16 extending through the gap between the end cap 8 and the stem 6 and slidably engaging the latter at its downstream end. Secured to the downstream end of this tube is a mushroom shaped head 17 which is adapted to seat against an annular seating 18 on the body part 1 in the closed position, and which in the fully open position of the valve has its rim embracing the cap 8. The space between the piston 15 and the upstream end of the casing 4 constitutes a closing cylinder 10b and the spaced between the piston 15 and the end cap 8 constitutes an opening cylinder 10a and incorporates a coiled compression spring 19 urging the head 17 towards the fully open position.

The closing chamber 9b is in communication with the interior of the stem 6 at its upstream end, and the downstream end of the stem incorporates regulating ports 20 arranged to be covered by the tubular part 16 when the head 17 is in its fully closed position. The head 17 incorporates an aperture 21 through which air can flow from its upstream to its downstream side at a restricted rate. Moreover, air at inlet pressure can enter the closing chamber 9b at a restricted rate through the clearance 4a between the casing 4 and the skirt 12.

The inlet 2 is also in communication, by way of a passage 24 incorporating a filter 22, with a valve 23a mounted on a stem 23 movable by a solenoid. The further side of the valve 23a is in communication, by way of a passage 25, with a chamber 26. Also mounted on the stem is a valve 23b which under certain conditions to be described, when the valve 23a is closed, allows a restricted flow of air from the chamber 26 to atmosphere.

The chamber 26 contains a bellows 26a which operates two pairs of valves simultaneously. The one pair of valves 27, 28 is arranged to place the passage 24 in communication with the opening and closing cylinder 10a, 10b in turn respectively as the bellows is operated and the other pair of valves 29, 30 is arranged so that the cylinder opposite to that which is in communication with the passage 24 is exhausted to atmosphere.

The passage 24 is also in communication with a regulator valve which controls the pressure of air in the passage 31. The regulator comprises a spring biased member 32, against which the air pressure acts and a coupled closure member 33 which, when the valve is regulating, controls the size of the opening of the passage 24 at its point of entry into the regulator. The regulator is also provided with a variable rate adjusting orifice 34 which controls the flow of air past the closure member 33 when the regulator is operating and which improves the stability thereof. The passage 31 is in communication with the opening chamber 9a and is also in communication with the chamber 26 by way of a relief valve 35. The chamber 26 is also in communication by way of a relief valve 37 with the outlet 3.

In use with the solenoid de-energized, and the valve 23a closed, the pressure at the outlet 3 is controlled by varying the size of the opening 5 uncovered by the skirt 12. The position of the skirt is determined by the pressure at the outlet 3 of the valve acting on one side of the closure member 11, by way of the ports 20 and the hollow stem 6, and by the combined force exerted by the springs 13, 14 and the regulated pressure acting on the other side of the closure member. If the pressure at the outlet increases then the skirt will move to reduce the size of the openings and vice versa.

When it is desired to close the valve the solenoid is energized and the valve 23a is opened. Air at inlet pressure enters the chamber 26 via the passage 25 causing the bellows 26a to move the valves 27, 28, 29, and 30 into the opposite positions to those shown in FIGURE 2. Air at inlet pressure is admitted to the closing cylinder 10b and the head 17 is moved against the seating 18 by the closure member 15 against the action of the spring 19. The closing action is assisted by the pressure of air acting on the head as the latter moves beyond the skirt. As the head moves towards its closed position the ports 20 are closed by the tubular portion 16 and the pressure of air leaking between the skirt 12 and the casing 4 builds up in the closing chamber 9b. When the pressure is sufficient the closure member 11 is urged to the closed position. To open the valve again the solenoid is de-energized and the valves 27, 28, 29 and 30 move to allow the closure member 15 and the head 17 to assume the open position. The aperture 21 is provided to prevent the head being held closed by the pressure of leakage air acting on it. As soon as the ports 20 are uncovered by the tubular portion 16 the air pressure built up in the closing chamber 9b is released and the closure member 11 and skirt 12 are moved away from their closed positions by the combined action of the springs 13, 14 and the regulated pressure in the opening chamber 9a. The valve then regulates the pressure as described.

The relief valves 35, 37 are incorporated in the control circuit so that in the event of failure of parts of the valve the system to which the valve is connected will be protected from excessive pressures which might occur.

If the pressure at the outlet 3 rises as for instance if the skirt 12 or closure member 11 sticks the relief valve 37 will open and allow air pressure to act on the bellows 26a. The head 17 will move to a closed position as previously described and the pressure at the outlet will be reduced. The bellows will expand again, air being exhausted from the chamber via the valve 23b and move the associated valve to a position to cause the head to be urged off the seating. However due to the air pressure acting on the underside of the head the latter will remain on the seating and the valve will be effectively closed.

In another case the regulator may stick such that the regulated air pressure is too high. In this case the relief valve 35 opens to allow air to act on the bellows to move the head and skirt towards the closed position as described. In this instance the head and skirt will not re-open because the bellows will always be subjected to the excessive regulated pressure.

It is intended in practice that such a valve as described should be operated in parallel with a similar valve and when a fault appears in one of the valves such as will cause an excessive pressure at the outlet both valves will go through the closing sequence as described but the faulty valve will remain closed and the good valve will automatically re-open and continue regulating as before.

Having thus described my invention what I claim as new and desire to secure by Letters Patent is:

1. A valve for controlling compressed air or other gas, comprising in combination a body part, an inlet at one side of the body part, an outlet at the opposite side of the body part, a relatively fixed hollow casing extending from the body part into the inlet, said casing having a cylindrical internal periphery and being closed at its upstream end, whilst providing angular spaced openings adjacent the body part through which air can flow from the inlet to the outlet, a relatively fixed hollow stem extending coaxially within the casing, a relatively fixed intermediate part extending co-axially within the casing to define therein a pair of concentric annular chambers one within the other, a first closure member movable axially within the outer chamber in the manner of a piston, said first closure member having a part adapted to cover said openings in the closed position of the valve, a second closure member movable in the inner annular chamber in the manner of a piston, said second closure member having at one end a head adapted to engage a seating on the body part in the closed position of the valve, and resilient means urging the second closure member towards an open position, means in said outer chamber biasing said first closure member to an open position, passage means communicating outlet pressure to said first closure member for applying a closing force thereto, and further means actuable to admit inlet pressure to said inner chamber for applying a closing force to said second closure member, said second closure member head lying slightly within a part of said first closure member when said second closure member is fully open such that when the head of the second closure member is exposed beyond said part of the first closure member the flow of fluid from the inlet to the outlet will cause the head to be moved onto its seating.

2. A valve according to claim 1, wherein restricted passage means communicates inlet pressure to said outer chamber, and said second closure member carries valve means for blocking the first mentioned passage means upon movement of said second closure member towards a closed position whereby movement of the second closure member to the closed position will automatically cause closing of the first closure member.

References Cited in the file of this patent

UNITED STATES PATENTS

| | | |
|---|---|---|
| 1,207,002 | Doble | Dec. 5, 1916 |
| 1,419,455 | Guelbaum | June 13, 1922 |

FOREIGN PATENTS

| | | |
|---|---|---|
| 1,148,132 | France | June 17, 1957 |